Figure 2:
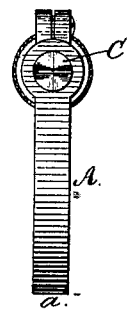

G. M. PRATT.
Micrometer-Gage.

No. 202,866. Patented April 23, 1878.

Attest:
H. L. Perrine
J. A. Rutherford

Inventor.
George M. Pratt.
By James L. Norris.
Atty.

UNITED STATES PATENT OFFICE.

GEORGE M. PRATT, OF MIDDLETOWN, CONNECTICUT, ASSIGNOR TO THE VICTOR SEWING MACHINE COMPANY, OF SAME PLACE.

IMPROVEMENT IN MICROMETER-GAGES.

Specification forming part of Letters Patent No. 202,866, dated April 23, 1878; application filed March 23, 1878.

*To all whom it may concern:*

Be it known that I, GEORGE M. PRATT, of Middletown, in the county of Middlesex and State of Connecticut, have invented certain new and useful Improvements in Micrometers, of which the following is a specification:

This invention relates to that class of micrometer-gages having horseshoe-shaped frames, in which the object to be measured is clamped between a suitable abutment and the tip of a micrometer-screw.

In order that the measurement by such an instrument shall be absolutely correct, it is necessary that the surfaces of said abutment and screw shall be perfectly smooth, and they should, therefore, be made as hard as possible, to resist abrasion and wear. In hardening these surfaces, the ordinary methods of tempering have been employed, the screw being completely formed and adjusted while the metal of which it was composed was soft, and afterward tempered. In thus tempering the screw after its complete formation, it has been found that its adjustment is always more or less impaired, as the heat necessary in the process of tempering expands the metal, a portion of the expansion being permanent, and the contraction, on cooling, unequal; so that, though a micrometer-screw should be perfectly accurate before being tempered, it would often, after tempering, be found so altered as to materially affect its accuracy in the minute measurements for which such instruments are employed, and is then worthless for its intended purpose. Besides, when the screw is first perfectly accurate, if its tip becomes much worn, a new adjustment or the substitution of a new screw is necessary—in either event involving more or less expense.

The bar forming the horseshoe or U shaped frame of such an instrument has heretofore been formed of uniform width and thickness throughout its length; and, in order to give it sufficient rigidity to prevent springing, this frame has been of inconvenient weight and bulk.

To obviate the necessity for heating the screws for tempering, to provide for their easy repair, thus reducing the expense, while preserving the accuracy of micrometer-gages, and also to render the frame of such an instrument strong, light, and of elegant shape, is the object of my invention; and it consists, first, in a micrometer-gage screw, having a socket formed in its end, and provided with a separate tip of tempered steel or similar hard material, whereby the necessity for heating the screw, in order to temper the tip, is obviated, and said screw is rendered easy to repair by the simple replacement of a worn tip by a new one, properly hardened and adjusted; second, in forming a micrometer-gage frame of an approximately crescent shape, or semicircular and tapering from its middle portion to its ends, in which the screw-bearings are located.

Figure 1:
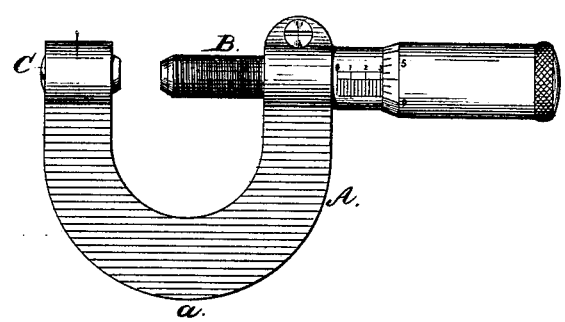
Figure 4:
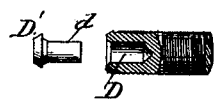
Figure 3:
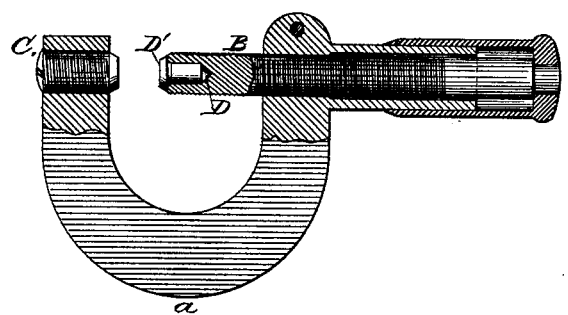

In the accompanying drawing, Figure 1 is a side elevation of a micrometer-gage constructed according to my invention. Fig. 2 is an end view. Fig. 3 is a section on line $x\ x$, Fig. 2, and Fig. 4 shows a sectional view of the socketed end of the screw with its separate tip detached.

The letter A indicates the frame; B, the micrometer-screw, and C the adjusting abutment-screw. D is the socket formed in the end of the screw, and D' is the tempered tip, having a shank, $d$, which fits in said socket. It is between the outer flat surface of this tip and the tip of the adjusting-screw C that the object to be measured is placed.

The screw B is formed of steel, without tempering, and the tip D' is formed separately, tempered as hard as possible, and its shank is then inserted into the socket D, which it should fit closely, when the screw is complete and ready for use in a gage.

In the manufacture of micrometer-screws heretofore, many, which, before tempering, were of the exact length required, and of uniform pitch between their threads, have, after tempering, been discarded on account of unevenness of pitch, shortness, change in diameter, or crookedness. The socketed screw B not being tempered after cutting, is, of course, exempt from change, and only the tempered tip requires fitting.

It will be observed that the middle, $a$, is the widest portion of the frame, which decreases in width toward the ends, this increased width being for the purpose of imparting rigidity at that point where most required to resist springing of the ends, either inwardly or outwardly.

By this construction the frame of a gage of a given capacity may be made much lighter and neater in appearance than the old form of frame, having its width equal throughout, as it is obvious that when the middle portion has sufficient strength the dimensions of the ends may be either increased or decreased within certain limits without affecting the liability of the frame to spring, while the tapering form saves weight and relieves the instrument of an ungainly look.

Having now described my invention, I claim—

1. A gage-screw for measuring-instruments, having its end formed by a separate tip of tempered steel, substantially as set forth.

2. A micrometer-gage screw, having a socket formed in its end, and provided with a separate tip of tempered steel or similar hard material, substantially as and for the purpose set forth.

In testimony that I claim the foregoing I have hereunto set my hand in the presence of the subscribing witnesses.

GEO. M. PRATT.

Witnesses:
JAMES L. NORRIS,
JAMES A. RUTHERFORD.